US010834161B2

(12) United States Patent
Gabin et al.

(10) Patent No.: US 10,834,161 B2
(45) Date of Patent: Nov. 10, 2020

(54) DASH REPRESENTATIONS ADAPTATIONS IN NETWORK

(71) Applicant: Telefonaktiebolaget LM Ericsson (publ), Stockholm (SE)

(72) Inventors: Frederic Gabin, Bagnolet (FR); Thorsten Lohmar, Aachen (DE); Joseph Eric Turcotte, Montreal (CA); Cyril Iskander, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 502 days.

(21) Appl. No.: 14/916,401

(22) PCT Filed: Sep. 17, 2014

(86) PCT No.: PCT/IB2014/064603
§ 371 (c)(1),
(2) Date: Mar. 3, 2016

(87) PCT Pub. No.: WO2015/040559
PCT Pub. Date: Mar. 26, 2015

(65) Prior Publication Data
US 2016/0219091 A1 Jul. 28, 2016

Related U.S. Application Data

(60) Provisional application No. 61/878,862, filed on Sep. 17, 2013.

(51) Int. Cl.
*H04L 29/06* (2006.01)
*H04L 29/08* (2006.01)

(52) U.S. Cl.
CPC .......... *H04L 65/602* (2013.01); *H04L 65/103* (2013.01); *H04L 65/1023* (2013.01);
(Continued)

(58) Field of Classification Search
CPC ......... H04N 21/2402; H04N 21/23439; H04N 21/6373; H04L 29/06027
See application file for complete search history.

(56) References Cited

U.S. PATENT DOCUMENTS 6,577,746 B1 * 6/2003 Evans ................... G06F 21/608
382/100
6,976,267 B1 * 12/2005 Takano ............... H04L 12/2854
348/E5.108
(Continued)

FOREIGN PATENT DOCUMENTS

| EP | 2696552 A1 | 2/2014 |
| WO | 2013090280 A2 | 6/2013 |
| WO | 2013164017 A1 | 11/2013 |

OTHER PUBLICATIONS

Mohammed et al., EP 2696552 A1, application No. 12179522.3, Date of filing Jul. 8, 2012.*
(Continued)

*Primary Examiner* — David P Zarka
(74) *Attorney, Agent, or Firm* — Patent Portfolio Builders, PLLC

(57) ABSTRACT

Systems and methods relating to delivery of an alternate representation of a requested segment of a media content item to a terminal device are disclosed. In one embodiment, a system comprises a terminal device and a network node. The terminal device is configured to send a request for a first representation of requested media content, and receive a response to the request comprising a second representation of the requested media content, where the second representation of the requested media content is different than the first representation of the requested media content. The network node is configured to receive the request from the terminal device for the first representation of the requested media content, select the second representation of the (Continued)

requested media content, and send the response to the terminal device comprising the second representation of the requested media content.

24 Claims, 10 Drawing Sheets

(52) U.S. Cl.
CPC ........ *H04L 65/1026* (2013.01); *H04L 65/605* (2013.01); *H04L 65/80* (2013.01); *H04L 67/02* (2013.01); *H04L 67/2842* (2013.01)

(56) References Cited

U.S. PATENT DOCUMENTS

| | | | | |
|---|---|---|---|---|
| 7,143,432 | B1* | 11/2006 | Brooks | H04N 21/234363 725/105 |
| 7,587,454 | B2* | 9/2009 | Shabtai | H04L 29/06027 348/153 |
| 8,019,182 | B1* | 9/2011 | Wolfram | G06T 11/60 345/698 |
| 9,451,003 | B1* | 9/2016 | Bertz | H04L 65/80 |
| 2002/0038343 | A1* | 3/2002 | Masera | G06F 16/9577 709/203 |
| 2002/0188673 | A1* | 12/2002 | Gimson | H04L 29/06 709/203 |
| 2003/0204445 | A1* | 10/2003 | Vishik | G06Q 20/10 705/26.42 |
| 2004/0001536 | A1* | 1/2004 | Lohtia | H04W 28/22 375/225 |
| 2008/0052414 | A1* | 2/2008 | Panigrahi | H04N 21/23439 709/246 |
| 2008/0079758 | A1* | 4/2008 | Hayashibara | G06F 3/14 345/699 |
| 2008/0285936 | A1* | 11/2008 | Yampanis | H04N 7/17327 386/248 |
| 2009/0006199 | A1* | 1/2009 | Wang | G06Q 30/02 705/14.44 |
| 2009/0174895 | A1* | 7/2009 | Huster | G06F 3/1207 358/1.15 |
| 2009/0328124 | A1* | 12/2009 | Khouzam | H04N 21/234354 725/116 |
| 2010/0303146 | A1* | 12/2010 | Kamay | H04N 21/2343 375/240.02 |
| 2010/0306413 | A1* | 12/2010 | Kamay | H04N 19/503 709/247 |
| 2011/0082914 | A1* | 4/2011 | Robert | H04N 21/4788 709/219 |
| 2011/0082924 | A1* | 4/2011 | Gopalakrishnan | H04L 65/4084 709/223 |
| 2011/0164184 | A1* | 7/2011 | Avkarogullari | G06F 3/1431 348/571 |
| 2012/0016965 | A1* | 1/2012 | Chen | H04N 21/23439 709/219 |
| 2012/0124179 | A1 | 5/2012 | Cappio et al. | |
| 2012/0185530 | A1* | 7/2012 | Reza | H04N 21/2343 709/203 |
| 2012/0185607 | A1* | 7/2012 | Rhyu | H04L 67/02 709/231 |
| 2012/0331106 | A1* | 12/2012 | Ramamurthy | H04N 21/234327 709/218 |
| 2013/0060911 | A1* | 3/2013 | Nagaraj | H04N 21/234327 709/219 |
| 2013/0097309 | A1* | 4/2013 | Ma | H04L 29/08099 709/224 |
| 2013/0282917 | A1 | 10/2013 | Reznik et al. | |

OTHER PUBLICATIONS

International Preliminary Report on Patentability for International Patent Application No. PCT/IB2014/064603, dated Mar. 31, 2016, 11 pages.
Office Action in application No. 14783908.8 dated Sep. 1, 2017, 5 pages.
Author Unknown, "Technical Specification Group Services and System Aspects; Transparent end-to-end Packet-switched Streaming Service (PSS); Progressive Download and Dynamic Adaptive Streaming over HTTP (3GP-DASH) (Release 11)," Technical Specification 26.247, Version 11.3.0, 3GPP Organizational Partners, Jun. 2013, 113 pages.
International Search Report and Written Opinion for International Patent Application No. PCT/IB2014/064603, dated Jan. 19, 2015, 14 pages.

* cited by examiner

DASH REPRESENTATIONS ADAPTATIONS IN NETWORK

RELATED APPLICATIONS

This application is a 35 U.S.C. § 371 national phase filing of International Application No. PCT/IB2014/064603, filed Sep. 17, 2014, which claims the benefit of U.S. Provisional Application No. 61/878,862, filed Sep. 17, 2013, the disclosures of which are incorporated herein by reference in their entireties.

FIELD OF THE DISCLOSURE

The present disclosure relates to delivery of media content over a network and, in particular, modifying a request for a representation of media content.

BACKGROUND

In the interest of making media content more network friendly, Dynamic Adaptive Streaming over Hyper-Text Transfer Protocol (DASH) allows a media content item (e.g., a Television (TV) show, movie, or video clip) to be broken into multiple segments. Each segment is made available in multiple different representations. Each representation of a segment includes the same media content but a different encoding format (e.g., different resolution, different encoding bitrate, different compression ratio, etc.). The segments of the media content item and the corresponding representations of the segments are presented to a DASH compliant client in a manifest, which is referred to as a Media Presentation Description (MPD) document.

When streaming the media content item, a DASH compliant client automatically selects a desired representation for a next segment of the media content item to download and play from the available representations of the next segment. In particular, the DASH compliant client automatically selects the representation with the highest bitrate possible given the decoding capabilities of the client and the quality of the network connection of the client. Thus, the selected representation of the next segment is automatically selected so that the DASH compliant client is able to: (a) download the segment in time for playback without causing stalls or re-buffering events in the playback and (b) render the media content of the downloaded segment.

As decoding abilities of terminal devices (e.g., devices in which DASH compliant clients are implemented) have increased due to both increased processing power in terminal devices and the addition of dedicated decoding chips, the selection of a representation of a segment of a media content item has effectively become a process of selecting a representation with the hopes of maximizing the use of the available bandwidth to the terminal device. This can cause problems in various network architectures, such as those in which the terminal device is connected using a Radio Access Network (RAN) of a cellular communications system (e.g., a Third Generation Partnership Project (3GPP) Long Term Evolution (LTE) or LTE-Advanced cellular communications system). Many different terminals all requesting media content at very high resolutions can cause congestion in the RAN that degrades the performance of not only the rendering of the media content but also traffic that may be of a higher priority.

Thus, there is a need for systems and methods that obviate or mitigate access network congestion resulting from many different terminal devices all requesting media content at very high resolutions.

SUMMARY

Systems and methods relating to delivery of an alternate representation of a requested segment of a media content item to a terminal device are disclosed. In one embodiment, a method of operation of a terminal device is provided. In one embodiment, the method includes sending a request for a first representation of requested media content and, in response, receiving a response comprising a second representation of the requested media content. The second representation of the requested media content is different than the first representation of the requested media content. By enabling delivery of a different representation of the requested media content to the terminal device, the method enables, in some embodiments, delivery of a less resource intensive representation of the requested media content to the terminal device. In this manner, congestion in an access network over which the representation of the requested media content is delivered to the terminal device can be mitigated.

In one embodiment, the method of operation of the terminal device further comprises receiving an indication that the second representation of the requested media content received by the terminal device is a different representation of the requested media content than the first representation of the requested media content.

In one embodiment, the method of operation of the terminal device further comprises sending a capability indicator that indicates that the terminal device is capable of receiving and consuming a representation of the requested media content that is different than the first representation of the requested media content.

In one embodiment, the request is a Dynamic Adaptive Streaming over Hyper-Text Transfer Protocol (DASH) request for the first representation of the requested media content, and the requested media content is one or more segments of media content identified in a Media Presentation Description (MPD) document for a particular media content item. Further, in one embodiment, the method of operation of the terminal device further comprises sending a capability indicator that indicates that the terminal device is capable of receiving and consuming a representation of the requested media content that is different than the first representation of the requested media content. Further, in one embodiment, the method of operation of the terminal device further comprises receiving an indication that the second representation of the requested media content received by the terminal device is a different representation of the requested media content than the first representation of the requested media content. In one embodiment, the response is a DASH response, and the indication that the second representation is a different representation than the first representation is contained in a Hyper-Text Transfer Protocol (HTTP) header of the DASH response.

In one embodiment, the second representation of the requested media content is from a same adaptation set as the first representation of the requested media content. In another embodiment, the second representation of the requested media content is less resource intensive than the first representation of the requested media content. In another embodiment, the second representation of the requested media content consumes less bandwidth than the first representation of the requested media content when delivering the second representation of the requested media content to the client device over a network. In one embodiment, the network is a Radio Access Network (RAN) of a cellular communications system. In another embodiment, the second representation of the requested media content has a different encoding format than the first representation of the requested media content.

In one embodiment, a terminal device comprises a network interface that communicatively couples the terminal device to a media content server via a network, a processor, and memory containing instructions executable by the processor whereby the terminal device is operative to send, via the network interface, a request for a first representation of requested media content from the media content server, and receive, via the network interface, a response comprising a second representation of the requested media content, the second representation of the requested media content being different than the first representation of the requested media content. By enabling delivery of a different representation of the requested media content to the terminal device, the terminal device enables, in some embodiments, delivery of a less resource intensive representation of the requested media content to the terminal device. In this manner, congestion in an access network over which the representation of the requested media content is delivered to the terminal device can be mitigated.

In one embodiment, a method of operation of a network node implementing a proxy server is provided. The method comprises receiving a request from a terminal device for a first representation of requested media content, obtaining information indicative of one or more network conditions, selecting a second representation of the requested media content in accordance with the request for the first representation of the requested media content and the information indicative of the one or more network conditions, and sending a response to the client device comprising the second representation of the requested media content. The second representation of the requested media content is different than the first representation of the requested media content. By delivering a different representation of the requested media content to the terminal device, the network node enables, in some embodiments, delivery of a less resource intensive representation of the requested media content to the terminal device. In this manner, congestion in an access network over which the network node delivers the representation of the requested media content to the terminal device can be mitigated.

In one embodiment, the method of operation of the network node further comprises, prior to sending the response to the terminal device, generating a modified request for the second representation of the requested media content, sending the modified request to a media content server, and receiving a response from the media content server comprising the second representation of the requested media content.

In one embodiment, the network node has access to a cache, and the method of operation of the network node further comprises, prior to sending the response to the terminal device, determining whether the second representation of the requested media content is stored in the cache and obtaining the second representation of the requested media content from the cache if the second representation of the requested media content is stored in the cache. The method further comprises, if the second representation of the requested media content is not stored in the cache, generating a modified request for the second representation of the requested media content, sending the modified request to a media content server, and receiving a response from the media content server comprising the second representation of the requested media content.

In one embodiment, the method of operation of the network node further comprises sending, to the terminal device, an indication that the second representation is different than the first representation.

In one embodiment, the method of operation of the network node further comprises receiving a capability indicator from the terminal device that is capable of receiving and consuming a representation of the requested media content that is different than the first representation of the requested media content.

In one embodiment, selecting the second representation comprises utilizing the first representation as a ceiling for the second representation such that the second representation is no more resource intensive than the first representation.

In one embodiment, the request is a DASH request for the first representation of the requested media content, and the requested media content is one or more segments of media content identified in a MPD document for a particular media content item. Further, in one embodiment, the method of operation of the network node further comprises receiving a capability indicator from the terminal device that indicates that the terminal device is capable of receiving and consuming a representation of the requested media content that is different than the first representation of the requested media content. In one embodiment, the method of operation of the network node further comprises sending, to the terminal device, an indication that the second representation of the requested media content sent to the terminal device is a different representation of the requested media content than the first representation of the requested media content. In one embodiment, the response is a DASH response, and the indication that the second representation is a different representation than the first representation is contained in an HTTP header of the DASH response.

In one embodiment, the second representation of the requested media content is from a same adaptation set as the first representation of the requested media content. In another embodiment, the second representation of the requested media content is less resource intensive than the first representation of the requested media content. In yet another embodiment, the second representation of the requested media content consumes less bandwidth than the first representation of the requested media content when sending the response comprising the second representation of the requested media content to the terminal device over a network. In one embodiment, the network is a RAN of a cellular communications system. In another embodiment, the second representation of the requested media content has a different encoding format than the first representation of the requested media content.

In one embodiment, a network node implementing a proxy server comprises a first interface that communicatively couples the network node to a media content server, a second interface that communicatively couples the network node to a terminal device, a processor, and memory containing instructions executable by the processor whereby the network node is operative to receive, via the second interface, a request from the terminal device for a first representation of requested media content, obtain information indicative of one or more network conditions, select a second representation of the requested media content in accordance with the request for the first representation of the requested media content and the information indicative of the one or more network conditions, and send, via the second interface, a response to the terminal device comprising the second representation of the requested media content. The second representation of the requested media content is different than the first representation of the requested media content. By delivering a different representation of the requested media content to the terminal device, the network node enables, in some embodiments, delivery of a less resource intensive representation of the requested media content to the terminal device. In this manner, congestion in an access network over which the network node delivers the representation of the requested media content to the terminal device can be mitigated.

In one embodiment, a system comprising a terminal device and a network node is provided. The terminal device is configured to send a request for a first representation of requested media content, and receive a response to the request comprising a second representation of the requested media content, where the second representation of the requested media content is different than the first representation of the requested media content. The network node is configured to receive the request from the terminal device for the first representation of the requested media content, obtain information indicative of one or more network conditions, select the second representation of the requested media content from a plurality of representations of the requested media content in accordance with the request for the first representation of the requested media content and the information indicative of the one or more network conditions, and send the response to the terminal device comprising the second representation of the requested media content.

In one embodiment, the network node is further configured to, prior to sending the response to the terminal device, generate a modified request for the second representation of the requested media content, send the modified request to a media content server, and receive a response from the media content server comprising the second representation of the requested media content.

In another embodiment, the network node has access to a cache, and the network node is further configured to, prior to sending the response to the terminal device, determine whether the second representation of the requested media content is stored in the cache, and obtain the second representation of the requested media content from the cache if the second representation of the requested media content is stored in the cache. The network node is further configured to, if the second representation of the requested media content is not stored in the cache, generate a modified request for the second representation of the requested media content, send the modified request to a media content server, and receive a response from the media content server comprising the second representation of the requested media content.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
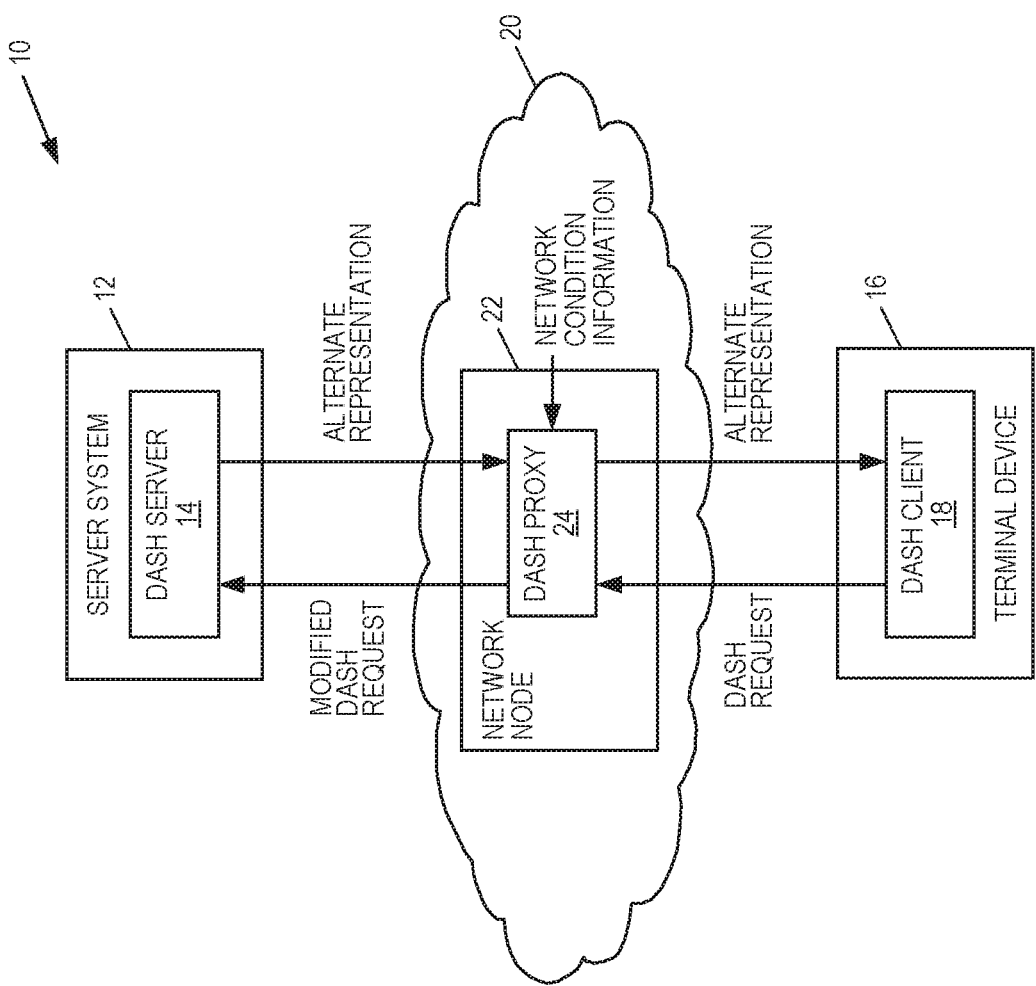
FIG. 1 illustrates a system that operates to deliver an alternate representation of requested media content to a terminal device according to one embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Dynamic Adaptive Streaming over Hyper-Text Transfer Protocol (DASH), which is also known as Moving Picture Experts Group DASH (MPEG-DASH), is an adaptive bitrate streaming protocol that enables high quality streaming of media content over a network from conventional Hyper-Text Transfer Protocol (HTTP) web servers. Those skilled in the art will appreciate that DASH has been adopted as a standard by a number of different standardization bodies. For example, DASH has been included in the MPEG Standards defined in ISO/IEC 23009-1. Three DASH profiles have been adopted by Third Generation Partnership Project (3GPP) in Technical Specification (TS) 26.247. DASH is also used by other standards and industry groups including Open Internet Protocol Television Forum (OIPF) and DASH Industry Forum (IF).

In general, DASH divides a media content item (e.g., a Television (TV) show, a movie, a video clip, a song, or the like) into multiple segments. Each segment is made available in multiple different representations. As used herein, a "representation" of a segment of the media content item is a deliverable encoded version of the segment of the media content item at a particular quality level. For instance, the same media content may be encoded at a multiple bitrate to provide multiple versions of the media content, where each version represents the same content but at a different visual quality. These versions are referred to herein as representations of the same media content. The representations of a segment include the same media content but different encoding formats (e.g., different resolution, different encoding bitrate, different compression ratio, etc.). The segments of the media content item and the corresponding representations of the segments are presented to a DASH compliant client in a manifest, which is referred to as a Media Presentation Description (MPD) document.

When streaming the media content item, a DASH compliant client (hereinafter referred to as a "DASH client") automatically selects a desired representation for a next segment of the media content item to download and play from the available representations of the next segment. Conventionally, the DASH client automatically selects the representation with the highest bitrate possible given the decoding capabilities of the DASH client and the quality of the network connection of the DASH client. In other words, the DASH client typically selects a representation of the next segment that maximizes the usage of the bandwidth available in the link to the DASH client (e.g., a downlink from a Radio Access Network (RAN)), regardless of other network considerations and concurrent delivery of media content to other DASH clients. As a result, this conventional approach can lead to congestions, particularly in the access network. Thus, particularly for a RAN of a cellular communications system, it may be desirable for the network operator to control the bandwidth usage of the DASH clients.

Systems and methods in which a request (e.g., a DASH request) from a client (e.g., a DASH client) is modified such that the representation of the requested media content delivered to the client is different than the representation originally requested by the client. In some embodiments, the representation of the requested media content delivered to the client is less resource intensive (e.g., reduced bandwidth requirements on the access network due to, e.g., smaller data size) than the representation originally requested. For example, the representation of the requested media content delivered to the client may have a lower bitrate, smaller data size, and/or the like. By having a lower data rate or data size, less data is transferred over the access network, which in turn mitigates network congestion. In this manner, congestion in the access network can be mitigated.

Notably, much of the following description focuses on embodiments that utilize the DASH protocol. However, the present disclosure is not limited thereto. The concepts disclosed herein can be utilized together with any suitable media content delivery scheme or protocol in which different representations of the same media content are available for delivery.

FIG. 1 illustrates a system 10 in which a request modification scheme is utilized according to one embodiment of the present disclosure. As illustrated, the system 10 includes a server system 12 in which a DASH server 14 is implemented, a terminal device 16 in which a DASH client 18 is implemented, and a network 20. The DASH server 14 is more generally referred to herein as a media content server. The network 20 includes a network node 22 in which a DASH proxy 24 is implemented. The DASH proxy 24 is more generally referred to herein as a proxy server or simply proxy. The server system 12 is implemented as one or more server computers (e.g., a single centralized server computer or multiple server computers operating in a collaborative manner). In one embodiment, the DASH server 14 implemented in software that is executed by one or more processors (e.g., Central Processing Unit(s) (CPU(s)), Application Specific Integrated Circuit(s) (ASIC(s)), or the like) in the server system 12. In particular, the DASH server 14 is a DASH compliant HTTP web server that operates to deliver media content items according to a DASH protocol.

The terminal device 16 is a physical device that operates to obtain and consume (i.e., render) media content. For example, the terminal device 16 may be a smart phone, a tablet computer, a personal computer, a set-top box, a gaming console, or the like. In one embodiment, the DASH client 18 is implemented in software that is executed by a processor (e.g., a CPU, an ASIC, or the like) of the terminal device 16. In particular, the DASH client 18 operates to request, receive, and consume media content according to the DASH protocol.

The network 20 is preferably a global network including an access network (not shown) by which the terminal device 16 accesses the network 20. The access network may be, for example, a RAN of a cellular communications system. The network node 22 is a node in the network 20. For example, the network node 22 may be a node in a RAN or core network of a cellular communications system. In one embodiment, the DASH proxy 24 is implemented in software that is executed by a processor (e.g., a CPU, an ASIC, or the like) of the network node 22. In general, all DASH communication between the DASH server 14 and the DASH client 18 (e.g., representations of requested segments of media content items, MPD documents, etc.) passes through the DASH proxy 24. The DASH proxy 24 may, in some embodiments, also provide a caching function by which the DASH proxy 24 caches representations of segments of media content items using any suitable caching technique. The caching function allows for the DASH proxy 24 to cache representations of requested segments of media content items so that subsequent requests from DASH clients for the same representations of the same segments will not create additional bandwidth usage for the link between the DASH proxy 24 and the DASH server 14.

The conventional approach to both caching and DASH content selection allow the DASH client 18 executed on the terminal device 16 to select the representation of the segment of the media content item for delivery. The representations may be cached by the DASH proxy 24, which may be part of the access network and operates by the access network provider. In this manner, the cached representations are closer to terminal devices (e.g., the terminal device 16) connected to the access network, which alleviates congestion issues between the access network and the DASH server 14 (i.e., the content server). However, in many modern networks, the most congested network segment is the segment in the access network. In many networks, such as RANs making use of a wireless data protocol such as High Speed Packet Access (HSPA) or Long Term Evolution (LTE) standards, the RAN can become congested without any indication that would be available to the terminal device 16. Typically, after the selected segment completes playout, the terminal device 16 would be able to select a less bandwidth intensive encoding for the next segment, but the user experience may have already been degraded due to congestion in the RAN. Furthermore, even without considering the viewing experience, there are many situations in which the terminal device 16 is better served by receiving a representation that consumes less bandwidth, but can be delivered without interruption.

With respect to the selection of a representation that can be delivered over the available access network, the terminal device 16 may not necessarily be the best node to select the representation for delivery. Instead, in embodiments of the present disclosure, the selection made by the DASH client 18 of the terminal device 16 indicated in a DASH request is examined by the DASH proxy 24, through which the selection message already passes, and the final decision on which representation is delivered to the DASH client 18 is made by the DASH proxy 24 (e.g., in accordance with information about network conditions that may not be available to the terminal device 16 on which the DASH client 18 is executed). As discussed below, this selection may be based on network conditions in the access network. In addition or alternatively, other criteria may be used for the selection such as, for example, a policy (e.g., an operator policy) that restricts maximum bitrate in certain geographic areas and/or time of day, a user/application subscription profile that limits maximum bitrate for some users/applications (e.g., a Spotify quality profile), and/or which representations, if any, of the requested media content are cached).

As illustrated, the DASH client 18 initially sends a DASH request to the DASH proxy 24. The DASH request is a request for a select representation of a desired segment(s) of a particular media content item. The DASH proxy 24 then selects a representation of the desired segment(s) of the media content item to be delivered to the DASH client 18 in accordance with the DASH request and information regarding one or more network conditions and/or other criteria. The representation selected by the DASH proxy 24 may be different than the representation selected by the DASH client 18 depending on the network conditions and/or the other criteria. The representation selected by the DASH proxy 24 is referred to herein as an alternate representation of the requested segment(s) of the media content item even though, in some situations (e.g., when network conditions are good), the representation selected by the DASH proxy 24 may be the same as that indicated in the DASH request from the DASH client 18.

The DASH proxy 24 then, in some embodiments, generates a modified DASH request and sends the modified DASH request to the DASH server 14. The modified DASH request is a request for the alternate representation of the segment(s) selected by the DASH proxy 24. Note that if the DASH proxy 24 also provides a caching function, the DASH proxy 24 may generate and send the modified DASH request if there is a cache miss for the alternate representation of the requested segment(s) of the media content item. If there is a cache hit, then the alternate representation can be obtained from cache. In response to the modified DASH request, the DASH server 14 sends a response to the DASH proxy 24 including the alternate representation of the segment(s) of the media content item. The DASH proxy 24 then sends the response including the alternate representation of the segment(s) of the media content item to the DASH client 18. The DASH client 18 then renders, or consumes, the alternate representation of the segment(s) of the media content item. The process is repeated for a next segment(s) of the media content item until playout is complete or is otherwise terminated. Using this process, congestion in the access network that would normally occur when, for example, simultaneously delivering media content to multiple terminal devices can be mitigated in a manner that is transparent to the end user.

Figure 2:
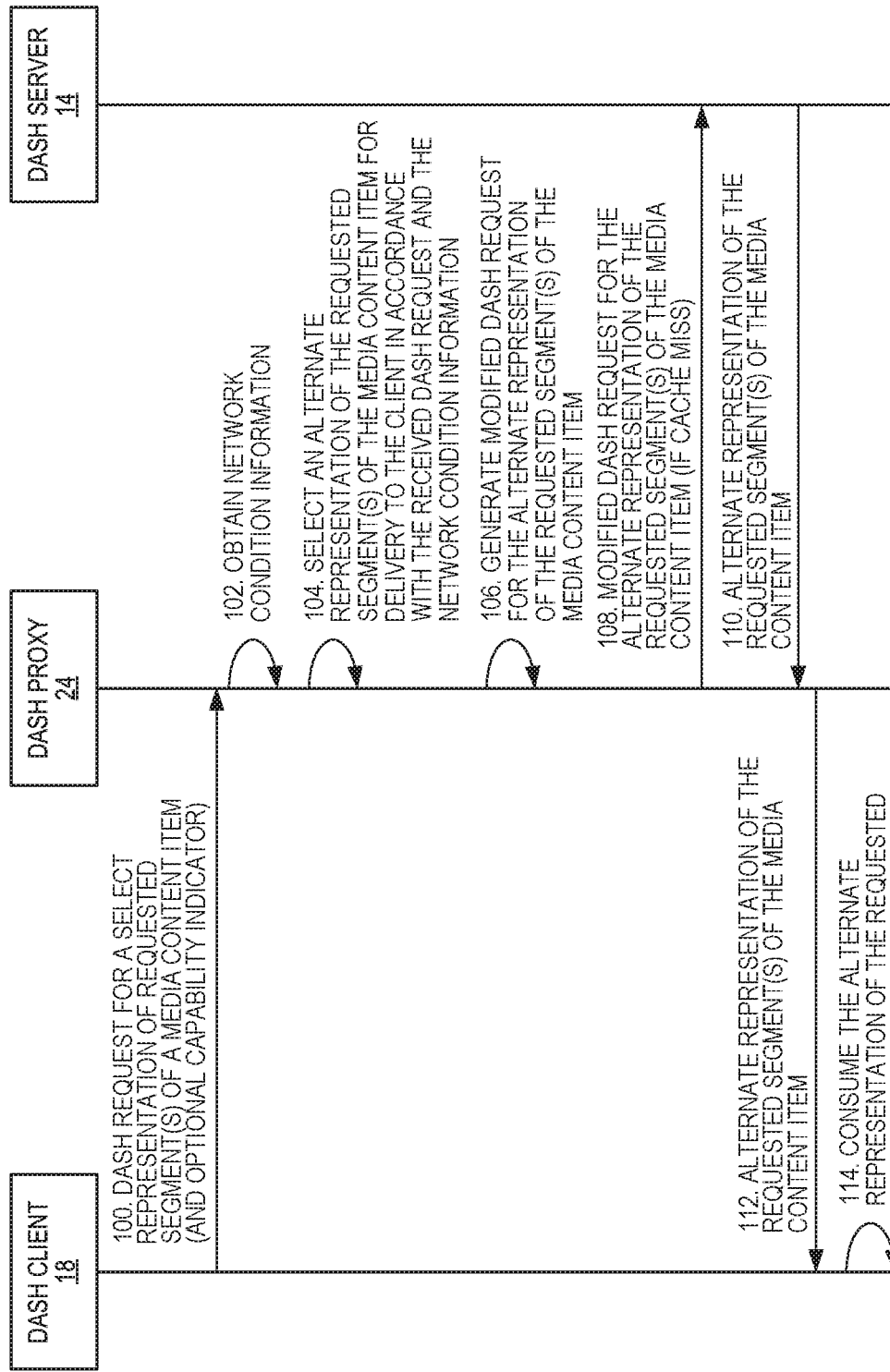
FIG. 2 illustrates the operation of the system of FIG. 1 according to one embodiment of the present disclosure.

FIG. 2 illustrates the operation of the system 10 of FIG. 1 in more detail according to one embodiment of the present disclosure. As illustrated, the DASH client 18 initially sends a DASH request to the DASH proxy 24 (step 100). The DASH request is a request for a select representation of a segment(s) of a media content item. The select representation is selected by the DASH client 18 from multiple available representations of the desired segment(s) using any suitable selection process (e.g., the conventional selection process that maximizes the amount of available bandwidth utilized for the delivery of the desired segment(s)). Notably, while not illustrated, the available representations of all segments of the media content item are, in some embodiments, identified in a manifest, or MPD documents, obtained by the DASH client 18 from the DASH server 14 prior to generating and sending the DASH request.

In some embodiments, the DASH request includes a capability indicator to signal to the DASH proxy 24 that the DASH client 18 is capable of receiving and consuming an alternate representation of the requested segment(s) of the media content item. In one embodiment, the capability indicator is an attribute included in an HTTP header of the DASH request. However, the capability indicator is not limited thereto. Any suitable mechanism of signaling that the DASH client 18 is capable of receiving and consuming an alternate representation of the requested segment(s) of the media content item may be used. If the capability indicator is not set (i.e., if the DASH client 18 is not capable of receiving and consuming an alternate representation), then the DASH proxy 24 delivers the representation of the segment(s) of the media content item indicated in the DASH request in the conventional manner. However, if the capability indicator is set (i.e., if the DASH client 18 is capable of receiving and consuming an alternate representation), then the DASH proxy 24 proceeds to select an alternate representation, as described below.

Assuming that the DASH client 18 is capable of receiving and consuming an alternate representation of the segment(s) requested in the DASH request, the DASH proxy 24 obtains information regarding one or more network conditions (step 102). Note that step 102 is optional and that the selection of the alternate representation may alternatively be performed based on one or more other criteria (e.g., operator policies, user/application subscriptions, content of the cache, if any, or the like). Also, in another embodiment, the selection may be based on the network condition(s) and one or more other criteria (e.g., operator policies, user/application subscriptions, content of the cache, if any, or the like).

The information regarding one or more network conditions includes information regarding network condition(s) in the access network between the DASH proxy 24 and the DASH client 18. For example, the information regarding the network condition(s) may include information regarding other terminal devices in the access network and their anticipated bandwidth consumption or high traffic on the backhaul links from other access areas. For instance, if the terminal device 16 is connected via a cell of a RAN, the information regarding the network condition(s) may include a number of terminal devices in the same cell, information indicating that the number of terminal devices in the same cell is greater than a predefined threshold, information indicating that the coverage of the cell is poor, information indicative of a high load on the backhaul network, or the like. As another example, the information regarding network condition(s) may include congestion information obtained from a Policy Control and Resource Function (PCRF). The information regarding the network condition(s) may be obtained from another network node that is aware of, e.g., local congestion conditions for the access network or a portion of the access network served by the DASH proxy 24.

The DASH proxy 24 then selects an alternate representation of the desired segment(s) of the media content item to be delivered to the DASH client 18 in accordance with the DASH request and, in this embodiment, information regarding one or more network conditions (step 104). The alternate representation is one of the available representations for the requested segment(s) that is acceptable to the DASH client 18 (e.g., can be rendered by the DASH client 18) as determined based on, e.g., the DASH request and can be delivered to the DASH client 18 in an acceptable manner as determined based on the network condition(s). Depending on the network condition(s), the representation selected by the DASH proxy 24 may be different than the representation selected by the DASH client 18. The representation selected by the DASH proxy 24 is referred to herein as an alternate representation of the requested segment(s) of the media content item even though, in some situations (e.g., when network conditions are good), the representation selected by the DASH proxy 24 may be the same as that indicated in the DASH request from the DASH client 18.

In one embodiment, the alternate representation selected by the DASH proxy 24 is a representation of the requested segment(s) that is less resource intensive than the representation of the requested segment(s) indicated in the DASH request. For example, the alternate representation may be a representation that requires less bandwidth when delivered from the DASH proxy 24 to the DASH client 18, particularly over the access network of the terminal device 16 in which the DASH client 18 is implemented. For example, the alternate representation may have a lower bitrate or other parameter that results in a smaller data size for the requested segment(s) of the media content item. In one particular embodiment, the DASH request may be utilized by the DASH proxy 24 as a ceiling for the alternate representation so that the alternate representation of the requested segment(s) is no more resource intensive than the requested representation of the requested segment(s). Establishing such a ceiling may also be implemented such that the alternate representation of the requested segment(s) is selected so that the alternate representation belongs to the same adaptation set as the requested representation and contains the same requested media content (e.g., the alternate representation of the requested segment(s) should have the same language track, close captioning, etc. as the requested representation of the requested segment(s)). An adaptation set contains multiple representations of the same segment(s). All representations in an adaptation set represent the same media content components and therefore contain media streams that are considered to be perceptually equivalent. While not essential, for more information regarding adaptation sets, the interested reader is directed to 3GPP TS 26.247 clause 8.4.3 and 8.4.3.3 (or its equivalent in International Organization for Standardization (ISO)/MPEG). By setting such a ceiling, the DASH proxy 24 can ensure that the alternate representation of the requested segment(s) can be properly rendered by the DASH client 18 (e.g., the alternate representation of the requested segment(s) is encoded using an encoding format that can be processed by the DASH client 18).

In some embodiments, it may be preferable that the alternative representation of the requested segment(s) has similar segment timing as the requested representation of the requested segment(s). This means that the segment carries the same duration of encoded media. For instance, a two second segment, which is encoded with 25 frames per second, contains 50 compressed video frames. It is preferred that the alternate representation contains a similar duration of encoded media.

It will also be understood that the DASH proxy 24 may also be constrained so that it will prevent confusion at the client by refraining from substitutions of requested content when range requests are being made by the client.

Next, if the DASH proxy 24 either does not implement a cache function or if the DASH proxy 24 does implement a cache function but there is a cache miss for the alternate representation of the requested segment(s) of the media content item, the DASH proxy 24 then generates a modified DASH request and sends the modified DASH request to the DASH server 14 (steps 106 and 108). The modified DASH request is a DASH request for the alternate representation selected by the DASH proxy 24 for the requested segment(s) of the media content item. In response to the modified DASH request, the DASH server 14 sends a response to the DASH proxy 24 including the alternate representation of the requested segment(s) of the media content item (step 110).

The DASH proxy 24 then sends a response including the alternate representation of the requested segment(s) of the media content item to the DASH client 18 (step 112). In one embodiment, the DASH proxy 24 also sends an indication to the DASH client 18 that the alternate representation of the requested segment(s) of the media content item delivered to the DASH client 18 in step 112 is different than the representation of the requested segment(s) requested in the original DASH request from the DASH client 18. This indication may also be referred to as a substitution indication in that the alternate representation has been substituted for the requested representation. In one particular embodiment, the indication is implemented as an attribute in an HTTP header of the response in step 112. However, an HTTP header attribute is only an example. The indication may be signaled to the DASH client 18 in any suitable manner (e.g., any suitable messaging mechanism). The DASH client 18 then renders or consumes the alternate representation of the requested segment(s) of the media content item (step 114). The process may then be repeated for a next segment(s) of the media content item until playout of the media content item is complete or is otherwise terminated.

Figure 3:
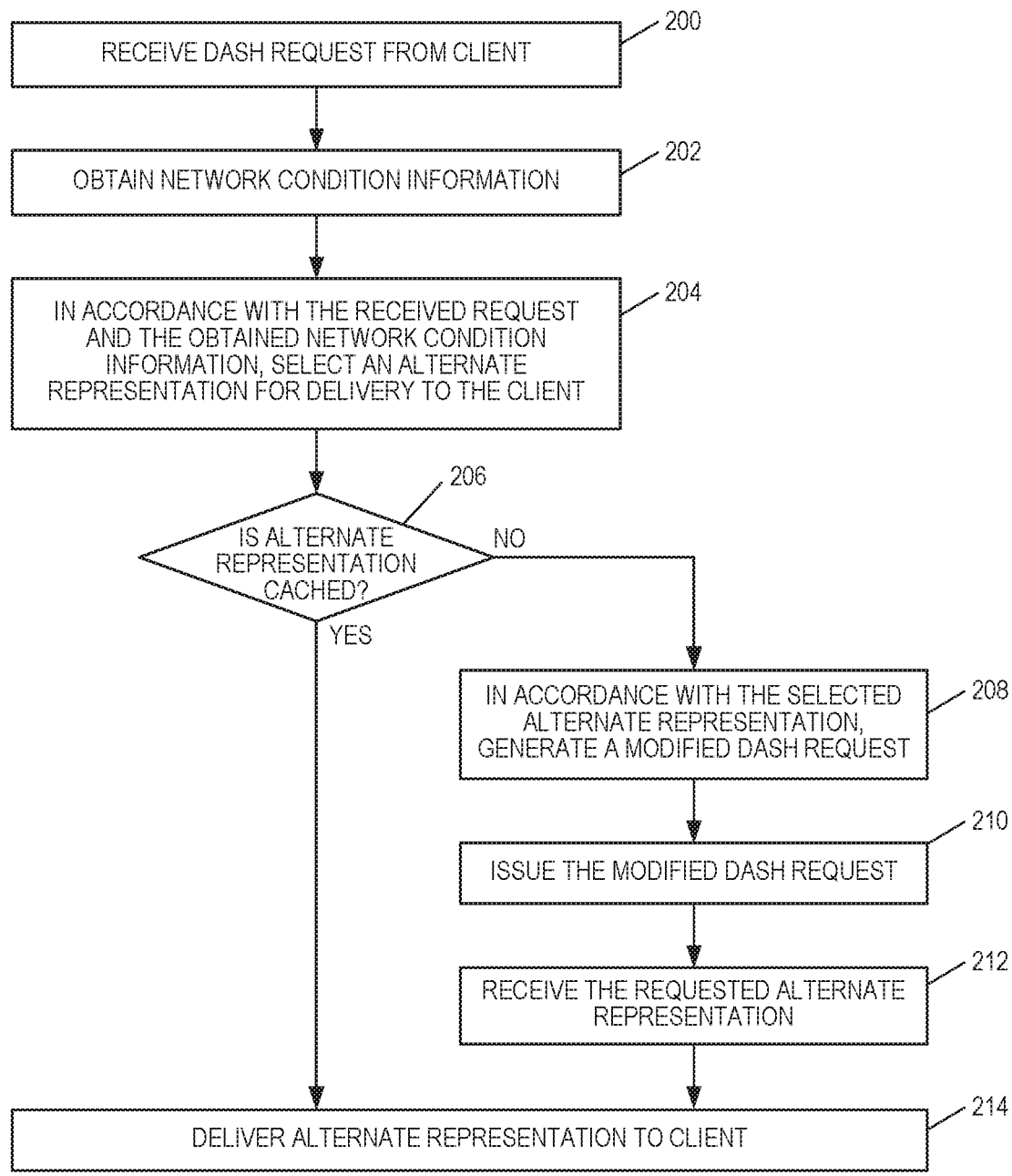
FIG. 3 is a flow chart that illustrates the operation of the proxy of FIG. 1 according to one embodiment of the present disclosure.

FIG. 3 is a flow chart that illustrates the operation of the DASH proxy 24 according to one embodiment of the present disclosure. In this embodiment, the DASH proxy 24 provides a caching function (i.e., is a proxy cache). As discussed above, the DASH proxy 24 receives a DASH request from the DASH client 18 for a select representation of a requested segment(s) of a media content item (step 200) and, in this embodiment, obtains information regarding one or more network conditions (step 202). The DASH proxy 24 then selects an alternate representation of the requested segment(s) of the media content item in accordance with the DASH request and the information regarding the network condition(s), as discussed above (step 204).

Since the DASH proxy 24 provides a caching function in this embodiment, the DASH proxy 24 next determines whether the alternate representation of the requested segment(s) of the media content item is cached (step 206). If so, the process proceeds to step 214. If not, the DASH proxy 24 generates a modified DASH request for the alternate representation of the requested segment(s) of the media content item (step 208). The DASH proxy 24 sends, or issues, the modified DASH request to the DASH server 14 and, in response, receives a response from the DASH server 14 including the alternate representation of the requested segment(s) of the media content item (steps 210 and 212). Lastly, whether proceeding from the "yes" branch of step 206 or from step 212, the DASH proxy 24 then delivers the alternate representation of the requested segment(s) of the media content item to the DASH client 18 (step 214).

Figure 4:
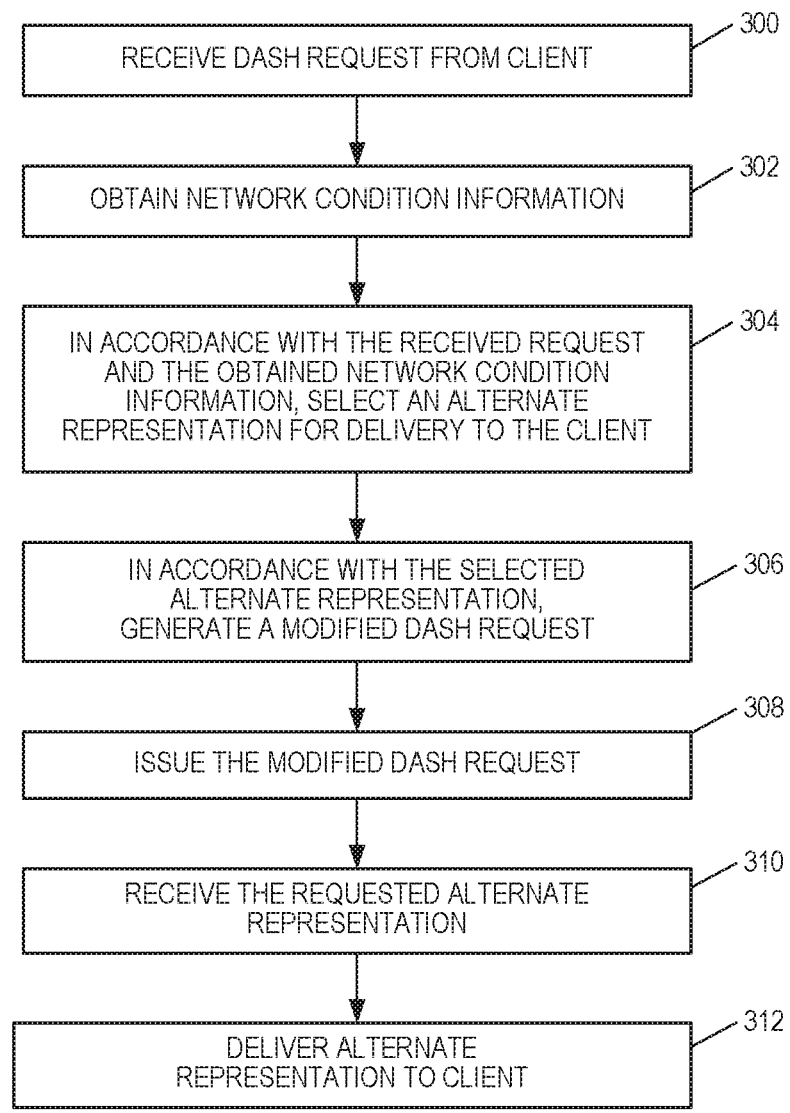
FIG. 4 is a flow chart that illustrates the operation of the proxy of FIG. 1 according to another embodiment of the present disclosure.

FIG. 4 is a flow chart that illustrates the operation of the DASH proxy 24 according to another embodiment of the present disclosure. In this embodiment, the DASH proxy 24 does not provide a caching function. As discussed above, the DASH proxy 24 receives a DASH request from the DASH client 18 for a select representation of a requested segment(s) of a media content item (step 300) and, in this embodiment, obtains information regarding one or more network conditions (step 302). The DASH proxy 24 then selects an alternate representation of the requested segment(s) of the media content item in accordance with the DASH request and the information regarding the network condition(s), as discussed above (step 304).

Since the DASH proxy 24 does not provide a caching function in this embodiment, the DASH proxy 24 generates a modified DASH request for the alternate representation of the requested segment(s) of the media content item (step 306). The DASH proxy 24 sends, or issues, the modified DASH request to the DASH server 14 and, in response, receives a response from the DASH server 14 including the alternate representation of the requested segment(s) of the media content item (steps 308 and 310). Lastly, the DASH proxy 24 delivers the alternate representation of the requested segment(s) of the media content item to the DASH client 18 (step 312).

Figure 5A:
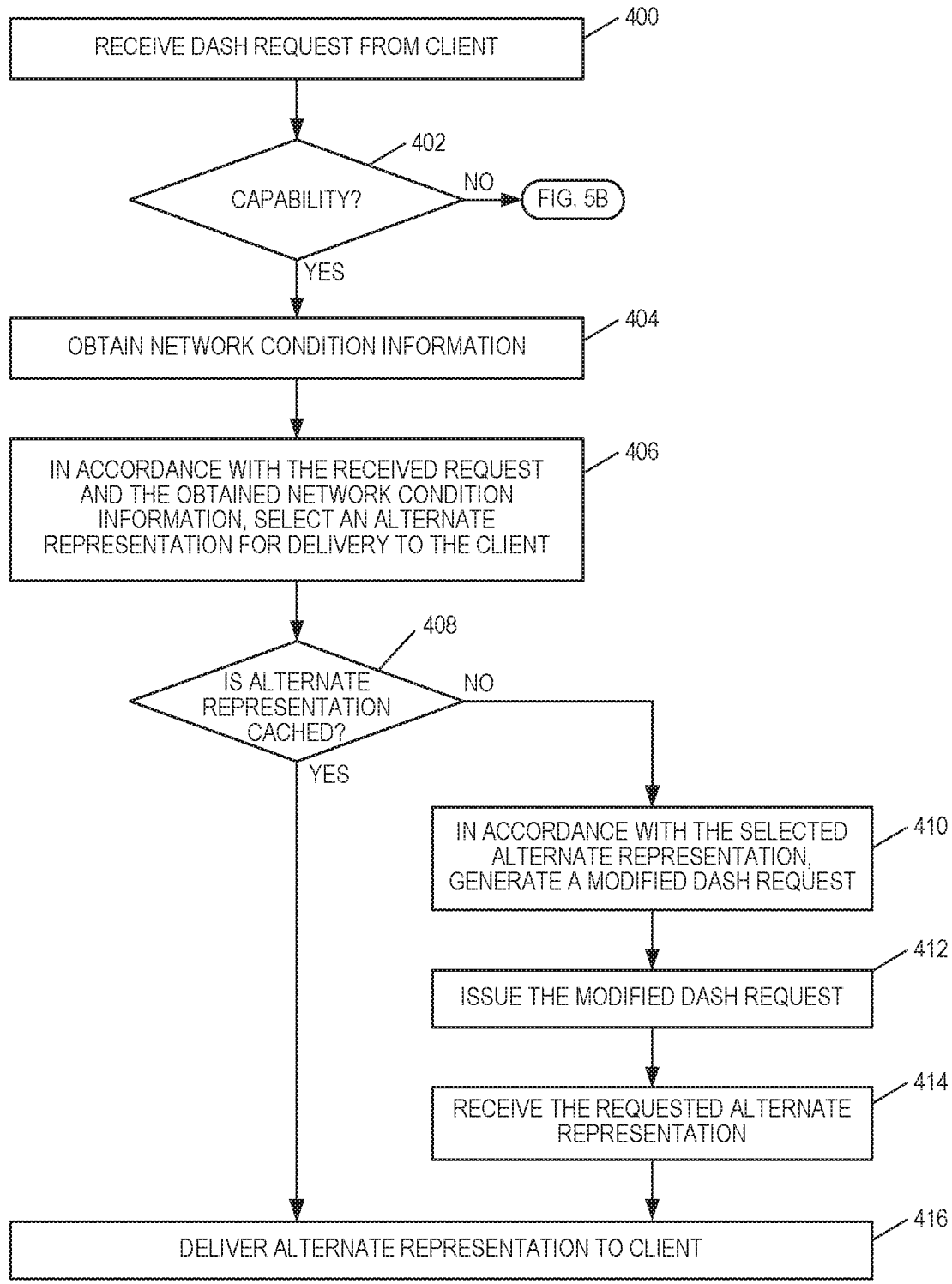
FIGS. 5A and 5B illustrate the operation of the proxy of FIG. 1 according to yet another embodiment of the present disclosure.
Figure 5B:
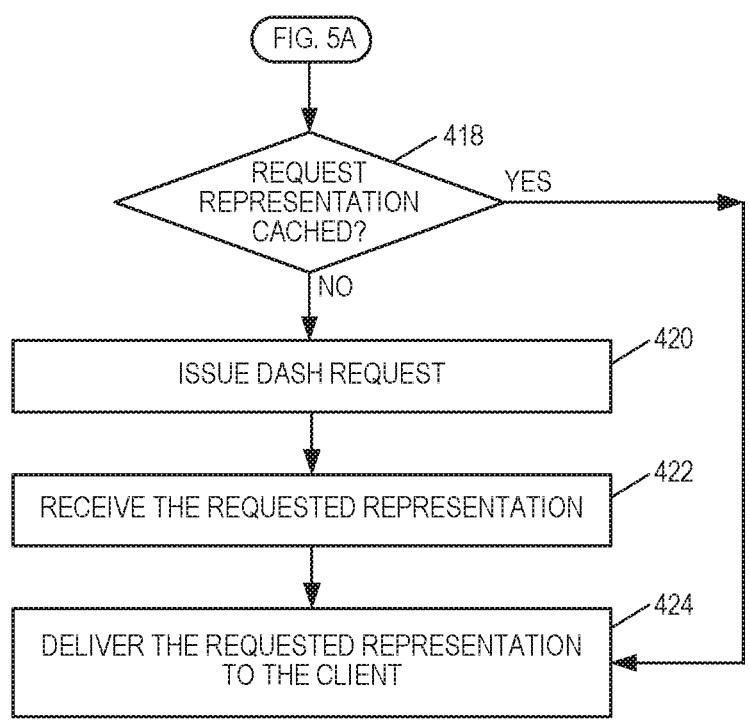

FIGS. 5A and 5B depict a flow chart that illustrates the operation of the DASH proxy 24 according to another embodiment of the present disclosure. In this embodiment, the DASH proxy 24 checks the capability of the DASH client 18 before selecting, obtaining, and delivering an alternate representation. In this embodiment, the DASH proxy 24 also provides a caching function, but is not limited thereto. As discussed above, the DASH proxy 24 receives a DASH request from the DASH client 18 for a select representation of a requested segment(s) of a media content item (step 400). The DASH proxy 24 then determines whether the DASH client 18 is capable of receiving and consuming an alternate representation of the requested segment(s) of the media content item (step 402). In one embodiment, the capability of the DASH client 18 to receive and consume an alternate representation is signaled from the DASH client 18 using, for example, an HTTP header attribute.

If the DASH client 18 is capable of receiving and consuming an alternate representation, in this embodiment, the DASH proxy 24 obtains information regarding one or more network conditions and selects an alternate representation of the requested segment(s) of the media content item in accordance with the DASH request and the information regarding the network condition(s), as discussed above (steps 404 and 406). Since the DASH proxy 24 provides a caching function in this embodiment, the DASH proxy 24 next determines whether the alternate representation of the requested segment(s) of the media content item is cached (step 408). If so, the process proceeds to step 416. If not, the DASH proxy 24 generates a modified DASH request for the alternate representation of the requested segment(s) of the media content item (step 410). The DASH proxy 24 sends, or issues, the modified DASH request to the DASH server 14 and, in response, receives a response from the DASH server 14 including the alternate representation of the requested segment(s) of the media content item (steps 412 and 414). Lastly, whether proceeding from the "yes" branch of step 408 or from step 414, the DASH proxy 24 then delivers the alternate representation of the requested segment(s) of the media content item to the DASH client 18 (step 416).

Returning to step 402, if the DASH client 18 is not capable of receiving and consuming an alternate representation, then the DASH proxy 24 delivers the requested representation of the requested segment(s) of the media content item. In particular, in this embodiment, the DASH proxy 24 determines whether the requested representation of the requested segment(s) of the media content item is cached (step 418). If so, the process proceeds to step 424. If not, the DASH proxy 24 sends, or issues, the DASH request to the DASH server 14 and, in response, receives a response from the DASH server 14 including the requested representation of the requested segment(s) of the media content item (steps 420 and 422). Lastly, whether proceeding from the "yes" branch of step 418 or from step 422, the DASH proxy 24 then delivers the requested representation of the requested segment(s) of the media content item to the DASH client 18 (step 424).

Figure 6:
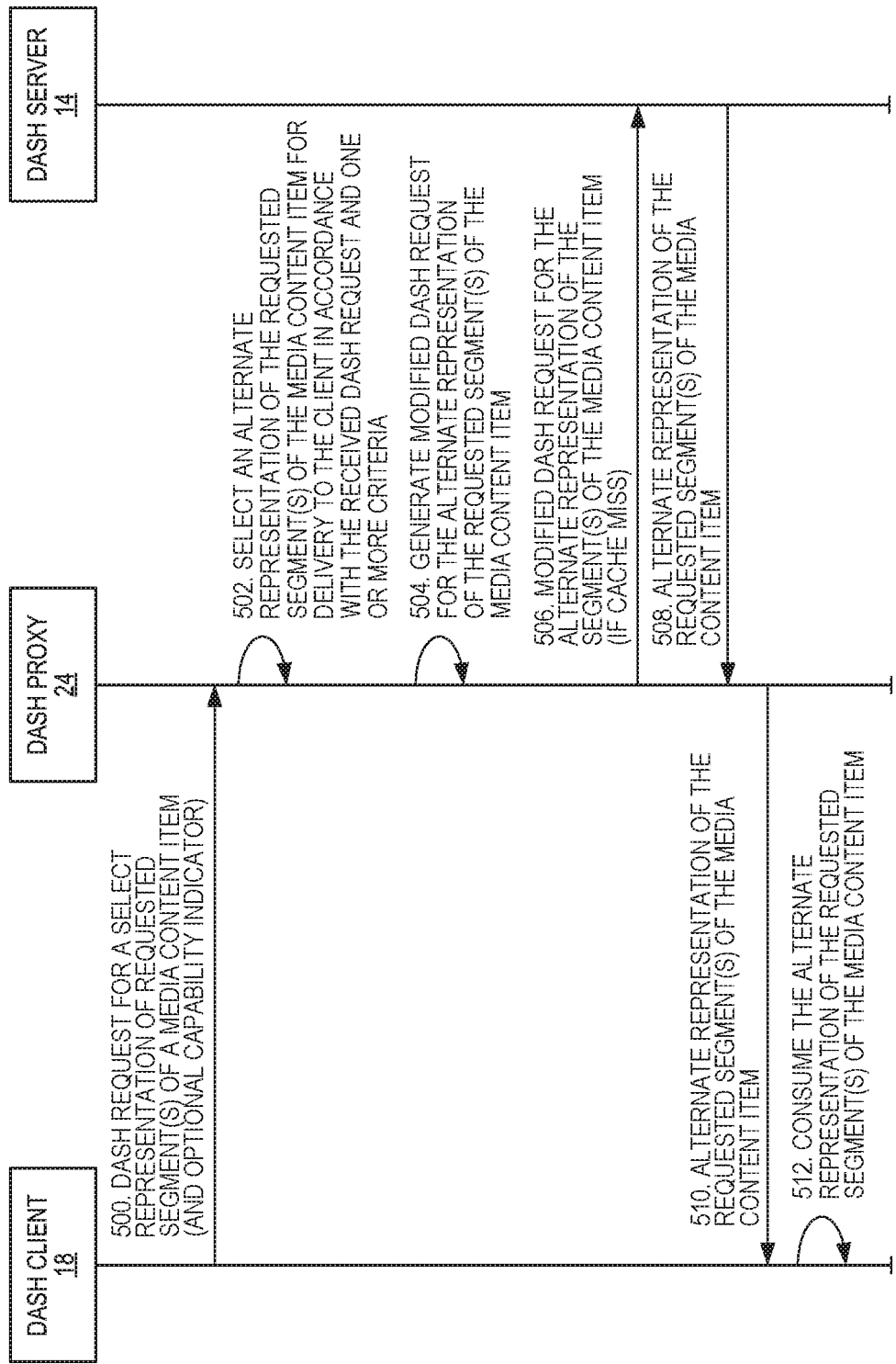
FIG. 6 is a flow chart that illustrates the operation of the proxy of FIG. 1 according to another embodiment of the present disclosure.

FIG. 6 illustrates the operation of the system 10 of FIG. 1 in more detail according to another embodiment of the present disclosure. This embodiment is similar to those described above but where the DASH proxy 24 selects the alternate representation based on any suitable criterion or criteria, which may or may not include network condition(s). As illustrated, the DASH client 18 initially sends a DASH request to the DASH proxy 24, as discussed above (step 500). In some embodiments, the DASH request includes a capability indicator to signal to the DASH proxy 24 that the DASH client 18 is capable of receiving and consuming an alternate representation of the requested segment(s) of the media content item. In one embodiment, the capability indicator is an attribute included in an HTTP header of the DASH request. However, the capability indicator is not limited thereto. Any suitable mechanism of signaling that the DASH client 18 is capable of receiving and consuming an alternate representation of the requested segment(s) of the media content item may be used. If the capability indicator is not set (i.e., if the DASH client 18 is not capable of receiving and consuming an alternate representation), then the DASH proxy 24 delivers the representation of the requested segment(s) of the media content item indicated in the DASH request in the conventional manner. However, if the capability indicator is set (i.e., if the DASH client 18 is capable of receiving and consuming an alternate representation), then the DASH proxy 24 proceeds to select an alternate representation, as described below.

Assuming that the DASH client 18 is capable of receiving and consuming an alternate representation of the requested segment(s) requested in the DASH request, the DASH proxy 24 selects an alternate representation of the desired segment(s) of the media content item to be delivered to the DASH client 18 in accordance with the DASH request and one or more predefined criteria (step 502). The predefined criteria may include one or more criteria based on network conditions and/or one or more criteria based on, for example, a policy (e.g., an operator policy) that restricts maximum bitrate in certain geographic areas and/or time of day, a user/application subscription profile that limits maximum bitrate for some users/applications (e.g., a Spotify quality profile), and/or which representations, if any, of the requested media content are cached).

The alternate representation is one of the available representations for the requested segment(s) that is acceptable to the DASH client 18 (e.g., can be rendered by the DASH client 18) as determined based on, e.g., the DASH request and satisfies the one or more predefined criteria. For example, if there is a policy that restricts maximum bitrate in a certain geographic area(s) and the terminal device 16 is located in a restricted geographic area, then the DASH proxy 24 selects an alternate representation that satisfies the maximum bitrate criterion. As another example, if there is a policy that restricts maximum bitrate during the hours of 4 pm to 6 pm and the current time of day is 5 pm, then the DASH proxy 24 selects an alternate representation that satisfies the maximum bitrate criterion. As yet another example, if a subscription of the user of the terminal device 16 or an application executing on the terminal device 16 that is requesting the media content item has a subscription profile that restricts maximum bitrate or some other parameter of the media content item, the DASH proxy 24 selects an alternate representation that satisfies the restrictions defined in the subscription profile. As a final example, the one or more criteria may include a criterion that considers any cached representation of the requested segment(s) of the media content item. If a representation of the requested segment(s) is cached, then the DASH proxy 24 may select the cached representation as the alternate representation to be delivered to the DASH client 18 if, for example, the cached representation is suitable for the DASH client 18 (e.g., can be rendered by the terminal device 16). When considering cached representations, the DASH proxy 24 may also consider other criteria such as, for example, a quality of the cached representation such that, for example, the cache representation is selected as the alternate representation only if the cached representation is of equal or approximately equal quality as the requested representation.

Next, if the DASH proxy 24 either does not implement a cache function or if the DASH proxy 24 does implement a cache function but there is a cache miss for the alternate representation of the requested segment(s) of the media content item, the DASH proxy 24 then generates a modified DASH request and sends the modified DASH request to the DASH server 14 (steps 504 and 506). The modified DASH request is a DASH request for the alternate representation selected by the DASH proxy 24 for the requested segment(s) of the media content item. In response to the modified DASH request, the DASH server 14 sends a response to the DASH proxy 24 including the alternate representation of the requested segment(s) of the media content item (step 508).

The DASH proxy 24 then sends a response including the alternate representation of the requested segment(s) of the media content item to the DASH client 18 (step 510). In one embodiment, the DASH proxy 24 also sends an indication to the DASH client 18 that the alternate representation of the requested segment(s) of the media content item delivered to the DASH client 18 in step 510 is different than the representation of the requested segment(s) requested in the original DASH request from the DASH client 18. This indication may also be referred to as a substitution indication in that the alternate representation has been substituted for the requested representation. In one particular embodiment, the indication is implemented as an attribute in an HTTP header of the response in step 510. However, an HTTP header attribute is only an example. The indication may be signaled to the DASH client 18 in any suitable manner (e.g., any suitable messaging mechanism). The DASH client 18 then renders or consumes the alternate representation of the requested segment(s) of the media content item (step 512). Note that if there is a cache hit for the alternate representation, then the DASH proxy 24 obtains the alternate representation from cache (rather than generating and sending the modified DASH request to the DASH server 14) and sends the response to the DASH client 18 including the alternate representation obtained from cache. The process may then be repeated for a next segment(s) of the media content item until playout of the media content item is complete or is otherwise terminated.

Figure 7:
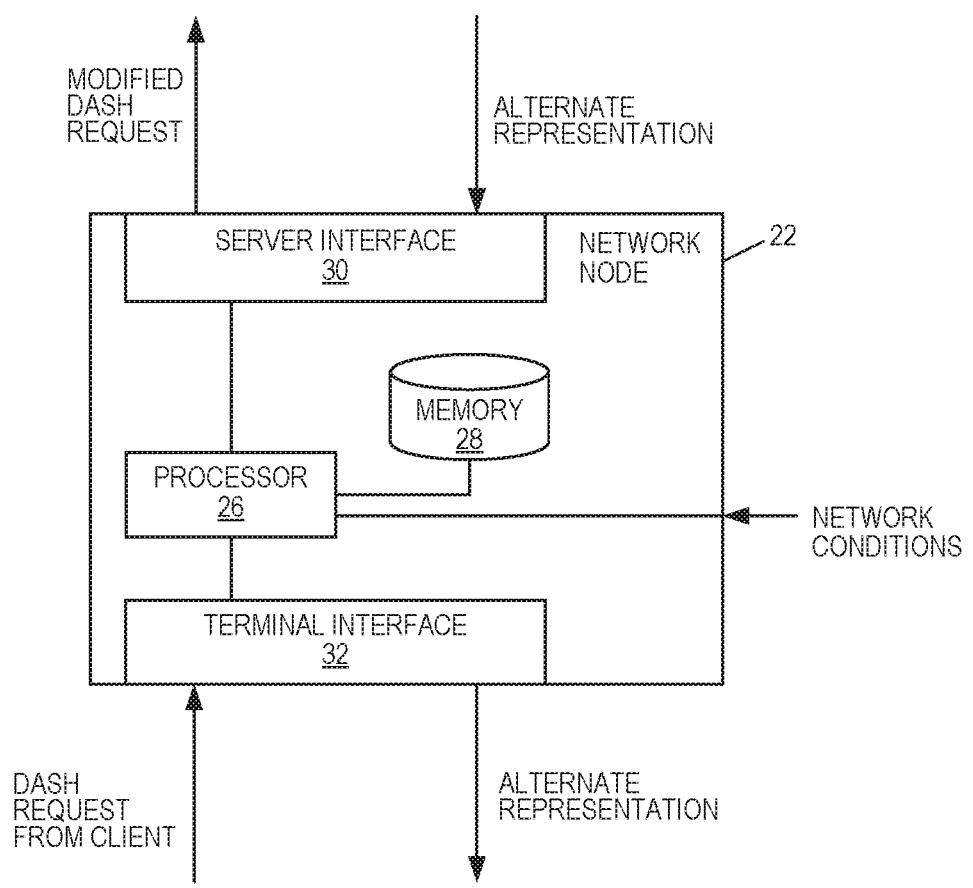
FIG. 7 is a block diagram of the network node of FIG. 1 according to one embodiment of the present disclosure.

FIG. 7 illustrates the network node 22 in which the DASH proxy 24 is implemented according to one embodiment of the present disclosure. As illustrated, the network node 22 includes a processor 26, memory 28, a server interface 30, and a terminal interface 32. In one embodiment, the DASH proxy 24 is implemented in software stored in the memory 28 that is executable by the processor 26, whereby the network node 22 operates to provide the functionality of the DASH proxy 24 according to any of the embodiments described above. The processor 26 is generally any hardware processor such as, for example, a CPU (single or multi-core), an ASIC, or the like, or any combination thereof. The server interface 30 is implemented in hardware or a combination of hardware and software and operates to enable communication between the network node 22 and the server system 12 according to any suitable protocol(s). The terminal interface 32 is implemented in hardware or a combination of hardware and software and operates to enable communication between the network node 22 and terminal devices (e.g., the terminal device 16) according to any suitable protocol(s).

In operation, by executing the DASH proxy 24, the processor 26 receives a DASH request from the DASH client 18 of the terminal device 16 via the terminal interface 32 and, in some embodiments, obtains information regarding network condition(s) (e.g., from other network node(s)). As discussed above, the DASH request is a request for a representation of a segment(s) of a media content item. Based on the DASH request and, in some embodiments, the network condition(s), the processor 26 determines or selects an alternate representation of the segment(s) to deliver to the DASH client 18 of the terminal device 16. The processor 26 generates a modified DASH request for the alternate representation of the segment(s) of the media content item and sends the modified DASH request to the DASH server 14 via the server interface 30 assuming that either the DASH proxy 24 does not implement a cache function or that there is a cache miss. Note that the cache may be implemented in the memory 28, some other internal or external storage device(s), or connected to the network node 22. In response, the alternate representation of the segment(s) of the media content item is received from the DASH server 14 via the server interface 30 and forwarded to the DASH client 18 via the terminal interface 32. Those skilled in the art will appreciate that the processor 26 and the memory 28 may not be physically in the same device, and may in fact be a virtual processor and memory in a distributed computing architecture.

Figure 8:
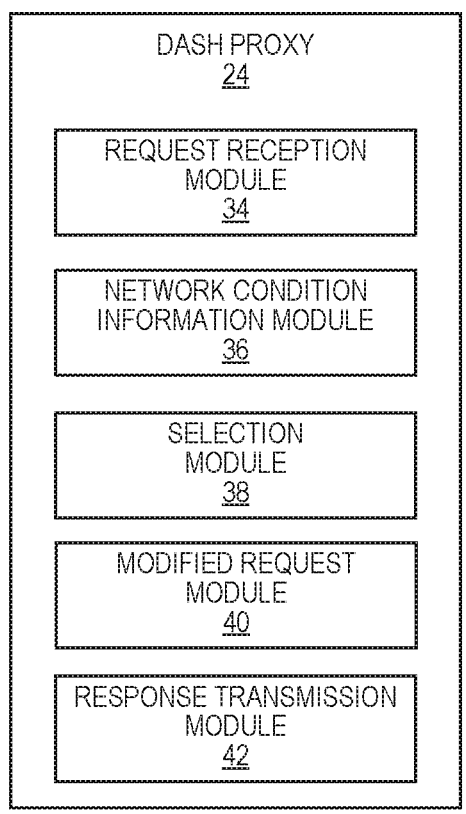
FIG. 8 is a block diagram of the proxy implemented by the network node of FIG. 1 according to one embodiment of the present disclosure.

FIG. 8 is a block diagram representing the DASH proxy 24 according to one embodiment of the present disclosure. In this embodiment, the DASH proxy 24 includes a request reception module 34, a network condition information module 36, a selection module 38, a modified request module 40, and a response transmission module 42, each of which is implemented in software executable by a processor (e.g., the processor 26 of the network node 22) to provide the functionality of the DASH proxy 24 according to any of the embodiments described herein. The request reception module 34 operates to receive a DASH request from the DASH client 18. The network condition information module 36 operates to obtain information regarding one or more network conditions. The selection module 38 operates to select an alternate representation of the requested segment(s) of the media content item according to the DASH request and the network condition(s), as discussed above. The modified request module 40 generates a modified DASH request for the alternate representation and sends the modified DASH request to the DASH server 14. As discussed above, in some embodiments, the DASH proxy 24 may provide a caching function in which case the modified request module 40 generates and sends the modified DASH request if the alternate representation of the requested segment(s) is not cached. The response transmission module 42 sends a response to the DASH request to the DASH client 18, where the response includes the alternate representation of the requested segment(s) of the media content item.

Figure 9:
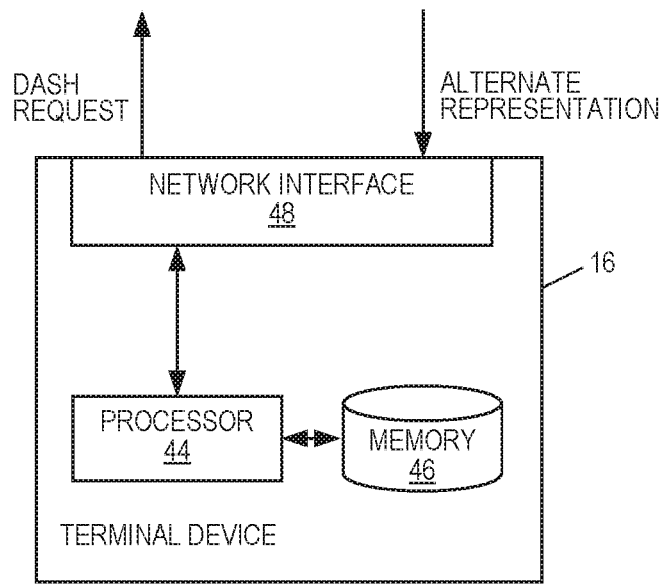
FIG. 9 is a block diagram of the terminal device of FIG. 1 according to one embodiment of the present disclosure.

FIG. 9 illustrates the terminal device 16 according to one embodiment of the present disclosure. As illustrated, the terminal device 16 includes a processor 44, memory 46, and a network interface 48. In one embodiment, the DASH client 18 is implemented in software stored in the memory 46 that is executable by the processor 44, whereby the terminal device 16 operates to provide the functionality of the DASH client 18 according to any of the embodiments described above. The processor 44 is generally any hardware processor such as, for example, a CPU (single or multi-core), an ASIC, or the like, or any combination thereof. The network interface 48 is implemented in hardware or a combination of hardware and software and operates to enable communication between the terminal device 16 and the network 20 according to any suitable protocol(s). In operation, by executing the DASH client 18, the processor 44 sends a DASH request via the network interface 48. As discussed above, the DASH request is a request for a representation of a segment(s) of a media content item. In response to the DASH request, the processor 44 receives a DASH response including an alternate representation of the requested segment(s) of the media content item.

Figure 10:
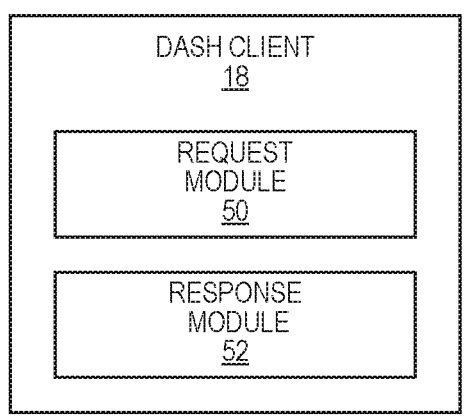
FIG. 10 is a block diagram of the client implemented by the terminal device of FIG. 1 according to one embodiment of the present disclosure.

FIG. 10 is a block diagram representing the DASH client 18 according to one embodiment of the present disclosure. In this embodiment, the DASH client 18 includes a request module 50 and a response module 52, each of which is implemented in software executable by a processor (e.g., the processor 44 of the terminal device 16) to provide the functionality of the DASH client 18 according to any of the embodiments described herein. The request module 50 operates to send a DASH request. The response module 52 receives and processes (e.g., consumes) a response to the DASH request from the DASH proxy 24, where the response includes an alternate representation of the requested segment(s) of the media content item.

Embodiments of the present disclosure may be represented as a software product stored in a machine-readable medium (also referred to as a computer-readable medium, a processor-readable medium, or a computer usable medium having a computer-readable program code embodied therein). The machine-readable medium may be any suitable tangible medium including a magnetic, optical, or electrical storage medium including a diskette, a Compact Disc Read Only Memory (CD-ROM), a digital Versatile Disc Read Only Memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the present disclosure. Those of ordinary skill in the art will appreciate that other instructions and operations necessary to implement the described embodiments may also be stored on the machine-readable medium. Software running from the machine-readable medium may interface with circuitry to perform the described tasks.

The systems and methods described herein provide numerous benefits and advantages. While not being limited to or by any particular benefit or advantage, some embodiments allow a network element (i.e., the DASH proxy 24) to substitute alternate representations of requested media content for the client selected representations of the requested media content media sets. In this manner, an access network operator is able to dynamically control the bandwidth usage of clients using its network DASH service while remaining quasi-transparent to the clients. Implementation of these methods at the network node 22 (e.g., an HTTP proxy cache or at another node in the control and data paths) has no impact on the implementation of terminal devices or content servers.

The following acronyms are used throughout this disclosure.
 3GPP Third Generation Partnership Project
 ASIC Application Specific Integrated Circuit
 CD-ROM Compact Disc Read Only Memory
 CPU Central Processing Unit
 DASH Dynamic Adaptive Streaming over Hyper-Text Transfer Protocol
 DASH IF Dynamic Adaptive Streaming over Hyper-Text Transfer Protocol Industry Forum
 DVD-ROM Digital Versatile Disc Read Only Memory
 HSPA High Speed Packet Access
 HTTP Hyper-Text Transfer Protocol
 ISO International Organization for Standardization
 LTE Long Term Evolution
 MPD Media Presentation Description
 MPEG Moving Pictures Expert Group
 OPIF Open Internet Protocol Television Forum
 PCRF Policy Control and Resource Function
 RAN Radio Access Network
 TS Technical Specification
 TV Television Those skilled in the art will recognize improvements and modifications to the embodiments of the present disclosure. All such improvements and modifications are considered within the scope of the concepts disclosed herein and the claims that follow.

What is claimed is:

1. A method of operation of a terminal device, the method comprising:
 sending a request for a first representation of requested media content, wherein the first representation of the requested media content is selected, by the terminal device, from available representations of the requested media content, and wherein the request includes a capability indicator that indicates that the terminal device is capable of receiving and consuming an alternate representation of the requested media content that is different than the first representation of the requested media content selected by the terminal device;
 in response to sending the request, receiving a response comprising a second representation of the requested media content, wherein the second representation of the requested media content is one of the available representations of the requested media content that is acceptable to the terminal device, and wherein the response is a Dynamic Adaptive Streaming over Hyper-Text Transfer Protocol (DASH) response; and
 receiving an indication, comprised in a Hyper-Text Transfer Protocol (HTTP) header of the DASH response, that the second representation of the requested media content is a different representation of the requested media content than the first representation of the requested media content.

2. The method of claim 1, wherein the request is a DASH request for the first representation of the requested media content, and wherein the requested media content is one or more segments of media content identified in a Media Presentation Description (MPD) document for a particular media content item.

3. The method of claim 2, wherein the second representation of the requested media content is from a same adaptation set as the first representation of the requested media content.

4. The method of claim 1, wherein the second representation of the requested media content is less resource intensive than the first representation of the requested media content.

5. The method of claim 1, wherein the second representation of the requested media content consumes less bandwidth than the first representation of the requested media content, when delivering the second representation of the requested media content to the terminal device over a network.

6. The method of claim 5, wherein the network is a Radio Access Network (RAN) of a cellular communications system.

7. The method of claim 1, wherein the second representation of the requested media content has a different encoding format than the first representation of the requested media content.

8. A terminal device comprising:
a network interface that communicatively couples the terminal device to a network;
a processor; and
memory containing instructions executable by the processor, whereby the terminal device is operative to:
send, via the network interface, a request for a first representation of requested media content, wherein the first representation of the requested media content is selected, by the terminal device, from available representations of the requested media content, and wherein the request includes a capability indicator that indicates that the terminal device is capable to receive and consume an alternate representation of the requested media content that is different than the first representation of the requested media content selected by the terminal device;
in response to the request being sent, receive, via the network interface, a response comprising a second representation of the requested media content, wherein the second representation of the requested media content is one of the available representations of the requested media content that is acceptable to the terminal device, and wherein the response is a Dynamic Adaptive Streaming over Hyper-Text Transfer Protocol (DASH) response; and
receive an indication, comprised in a Hyper-Text Transfer Protocol (HTTP) header of the DASH response, that the second representation of the requested media content is a different representation of the requested media content than the first representation of the requested media content.

9. A non-transitory computer readable medium comprising instructions executable by a processor of a terminal device, whereby the terminal device is operative to:
send a request for a first representation of requested media content, wherein the first representation of the requested media content is selected, by the terminal device, from available representations of the requested media content, and wherein the request includes a capability indicator that indicates that the terminal device is capable to receive and consume an alternate representation of the requested media content that is different than the first representation of the requested media content selected by the terminal device;
in response to the request being sent, receive a response comprising a second representation of the requested media content, wherein the second representation of the requested media content is one of the available representations of the requested media content that is acceptable to the terminal device, and wherein the response is a Dynamic Adaptive Streaming over Hyper-Text Transfer Protocol (DASH) response; and
receive an indication, comprised in a Hyper-Text Transfer Protocol (HTTP) header of the DASH response, that the second representation of the requested media content is a different representation of the requested media content than the first representation of the requested media content.

10. A method of operation of a network node, the method comprising:
receiving a request, from a terminal device, for a first representation of requested media content, wherein the first representation of the requested media content is one of available representations of the requested media content, and wherein the request includes a capability indicator that indicates that the terminal device is capable of receiving and consuming an alternate representation of the requested media content that is different than the first representation of the requested media content selected by the terminal device;
obtaining information indicative of one or more network conditions;
selecting a second representation of the requested media content in accordance with the request for the first representation of the requested media content and the information indicative of the one or more network conditions, wherein the second representation of the requested media content is one of the available representations of the requested media content that is acceptable to the terminal device;
sending a response, to the terminal device, comprising the second representation of the requested media content, wherein the response is a Dynamic Adaptive Streaming over Hyper-Text Transfer Protocol (DASH) response; and
sending an indication, to the terminal device, comprised in a Hyper-Text Transfer Protocol (HTTP) header of the DASH response that the second representation of the requested media content is a different representation of the requested media content than the first representation of the requested media content.

11. The method of claim 10, further comprising:
prior to sending the response to the terminal device:
generating a modified request for the second representation of the requested media content;
sending the modified request to a media content server; and
receiving the response, from the media content server, comprising the second representation of the requested media content.

12. The method of claim 10, wherein the network node has access to a cache, and wherein the method further comprises:

prior to sending the response to the terminal device:
  determining whether the second representation of the requested media content is stored in the cache;
    if the second representation of the requested media content is stored in the cache:
      obtaining the second representation of the requested media content from the cache; and
    if the second representation of the requested media content is not stored in the cache:
      generating a modified request for the second representation of the requested media content;
      sending the modified request to a media content server; and
      receiving the response, from the media content server, comprising the second representation of the requested media content.

13. The method of claim 10, wherein selecting the second representation of the requested media content comprises utilizing the first representation of the requested media content as a ceiling for the second representation of the requested media content such that the second representation of the requested media content is less resource intensive than the first representation of the requested media content.

14. The method of claim 10, wherein the request is a DASH request for the first representation of the requested media content, and wherein the requested media content is one or more segments of media content identified in a Media Presentation Description (MPD) document for a particular media content item.

15. The method of claim 14, wherein the second representation of the requested media content is from a same adaptation set as the first representation of the requested media content.

16. The method of claim 10, wherein the second representation of the requested media content is less resource intensive than the first representation of the requested media content.

17. The method of claim 10, wherein the second representation of the requested media content consumes less bandwidth than the first representation of the requested media content, when sending the response comprising the second representation of the requested media content to the terminal device over a network.

18. The method of claim 17, wherein the network is a Radio Access Network (RAN) of a cellular communications system.

19. The method of claim 10, wherein the second representation of the requested media content has a different encoding format than the first representation of the requested media content.

20. A network node comprising:
a first interface that communicatively couples the network node to a media content server;
a second interface that communicatively couples the network node to a terminal device;
a processor; and
memory containing instructions executable by the processor, whereby the network node is operative to:
  receive, via the second interface, a request from the terminal device for a first representation of requested media content, wherein the first representation of the requested media content is one of available representations of the requested media content, and wherein the request includes a capability indicator that indicates that the terminal device is capable to receive and consume an alternate representation of the requested media content that is different than the first representation of the requested media content selected by the terminal device;
  obtain information indicative of one or more network conditions;
  select a second representation of the requested media content in accordance with the request for the first representation of the requested media content and the information indicative of the one or more network conditions, wherein the second representation of the requested media content is one of the available representations of the requested media content that is acceptable to the terminal device;
  send, via the second interface, a response to the terminal device, wherein the response comprises the second representation of the requested media content, wherein the response is a Dynamic Adaptive Streaming over Hyper-Text Transfer Protocol (DASH) response; and
  send, to the terminal device, an indication comprised in a Hyper-Text Transfer Protocol (HTTP) header of the DASH response that the second representation of the requested media content is a different representation of the requested media content than the first representation of the requested media content.

21. A non-transitory computer readable medium comprising instructions executable by a processor of a network node, whereby the network node is operative to:
receive a request from a terminal device for a first representation of requested media content, wherein the first representation of the requested media content is one of available representations of the requested media content, and wherein the request includes a capability indicator that indicates that the terminal device is capable to receive and consume an alternate representation of the requested media content that is different than the first representation of the requested media content selected by the terminal device;
obtain information indicative of one or more network conditions;
select a second representation of the requested media content in accordance with the request for the first representation of the requested media content and the information indicative of the one or more network conditions, wherein the second representation of the requested media content is one of the available representations of the requested media content that is acceptable to the terminal device;
send a response, to the terminal device, comprising the second representation of the requested media content, wherein the response is a Dynamic Adaptive Streaming over Hyper-Text Transfer Protocol (DASH) response; and
send an indication, to the terminal device, comprised in a Hyper-Text Transfer Protocol (HTTP) header of the DASH response that the second representation of the requested media content is a different representation of the requested media content than the first representation of the requested media content.

22. A system comprising:
a terminal device configured to:
  send a request for a first representation of requested media content, wherein the first representation of the requested media content is selected, by the terminal device, from available representations of the requested media content, and wherein the request includes a capability indicator that indicates that the terminal device is capable to receive and consume an alternate representation of the requested media content that is different than the first representation of the requested media content selected by the terminal device;

in response to the request being sent, receive a response comprising a second representation of the requested media content, wherein the second representation of the requested media content is one of the available representations of the requested media content that is acceptable to the terminal device, and wherein the response is a Dynamic Adaptive Streaming over Hyper-Text Transfer Protocol (DASH) response; and receive an indication, comprised in a Hyper-Text Transfer Protocol (HTTP) header of the DASH response, that the second representation of the requested media content is a different representation of the requested media content than the first representation of the requested media content; and a network node configured to:
receive the request from the terminal device for the first representation of the requested media content;
obtain information indicative of one or more network conditions;
select the second representation of the requested media content from a plurality of representations of the requested media content in accordance with the request for the first representation of the requested media content and the information indicative of the one or more network conditions;
send the DASH response, to the terminal device, comprising the second representation of the requested media content; and send the indication, to the terminal device, comprised in the HTTP header of the DASH response.

23. The system of claim 22, wherein the network node is further configured to:
prior to sending the response to the terminal device:
generate a modified request for the second representation of the requested media content;
send the modified request to a media content server; and
receive the response, from the media content server, comprising the second representation of the requested media content.

24. The system of claim 22, wherein the network node has access to a cache, and wherein the network node is further configured to:
prior to sending the response to the terminal device:
determine whether the second representation of the requested media content is stored in the cache;
if the second representation of the requested media content is stored in the cache:
obtain the second representation of the requested media content from the cache; and
if the second representation of the requested media content is not stored in the cache:
generate a modified request for the second representation of the requested media content;
send the modified request to a media content server; and
receive the response, from the media content server, comprising the second representation of the requested media content.

* * * * *